(12) United States Patent
Underwood

(10) Patent No.: US 7,051,747 B1
(45) Date of Patent: May 30, 2006

(54) DUAL PURPOSE VENT ATTACHMENT ASSEMBLY

(76) Inventor: Joseph Underwood, 4575 170th St., Hugo, MN (US) 55038

( * ) Notice: Subject to any disclaimer, the term of this patent is extended or adjusted under 35 U.S.C. 154(b) by 384 days.

(21) Appl. No.: 10/436,627

(22) Filed: May 13, 2003

(51) Int. Cl.
*E03B 1/00* (2006.01)
(52) U.S. Cl. .................... 137/15.01; 137/377; 137/382
(58) Field of Classification Search ................ 137/377, 137/382, 15.01
See application file for complete search history.

(56) References Cited

U.S. PATENT DOCUMENTS 5,836,345 A * 11/1998 Ericson ....................... 137/382
5,971,014 A * 10/1999 Duren ......................... 137/526
5,975,123 A * 11/1999 Underwood ................. 137/382
6,164,317 A * 12/2000 Hanson ....................... 137/377
6,732,757 B1 * 5/2004 Benham ...................... 137/377

* cited by examiner

*Primary Examiner*—A. Michael Chambers
(74) *Attorney, Agent, or Firm*—Jacobson and Johnson

(57) ABSTRACT

A weather cap for gas valve comprising a gas valve vent attachment member for securing to a gas valve vent outlet, a cover connected to the gas valve vent attachment member with the cover and the gas valve attachment member forming a housing having a chamber therein, a vent limiter located in the chamber, a first gas passage in the housing for permitting ingress and egress of gas into the chamber from a gas valve, and a second gas passage in the housing with the second gas passage opened to the atmosphere to permit venting of gas to the atmosphere with the second gas passage being located on an underside of the chamber to thereby shield the vent limiter from blockage by preventing rain or snow from entering the chamber.

19 Claims, 3 Drawing Sheets

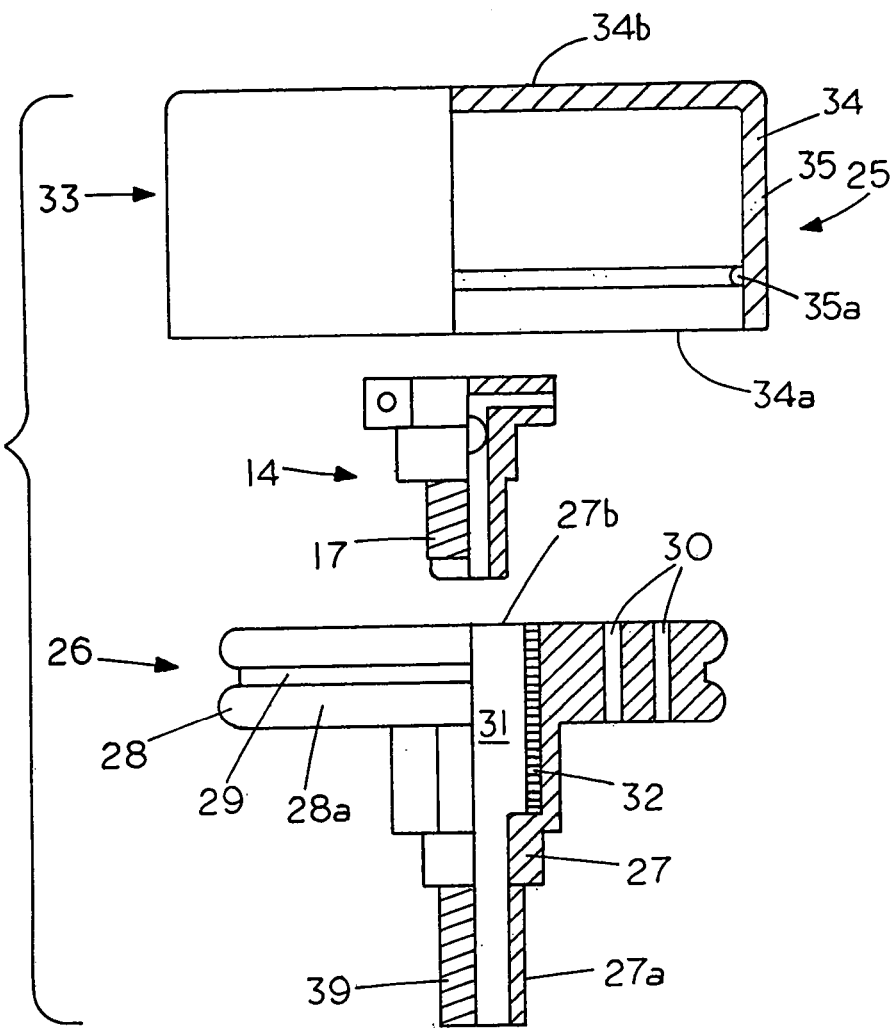
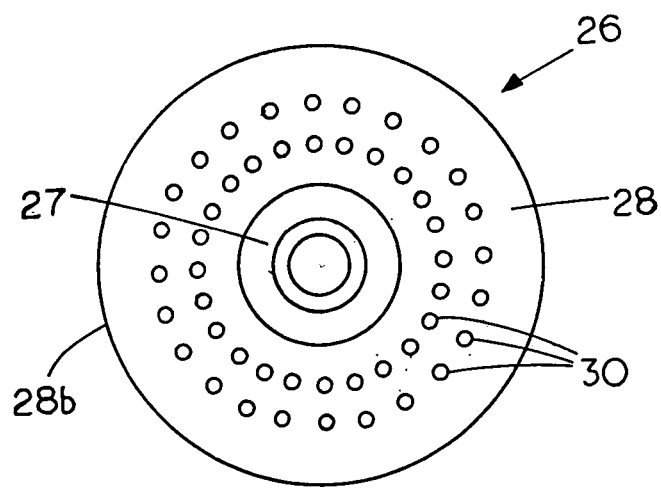
FIG. 4

DUAL PURPOSE VENT ATTACHMENT ASSEMBLY

FIELD OF THE INVENTION

This invention generally relates to gas valve pressure regulators, and more specifically to a dual-purpose vent attachment assembly that provides vent limiting capabilities as well as preventing atmospheric elements from entering or blocking the gas valve air vent.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of gas valves is well known in the art. Gas valve typically comprises an inlet, an outlet, and a chamber with a diaphragm located within the chamber. The chamber is normally vented to an outside atmosphere through an air vent to allow for the movement of the diaphragm to thereby regulate the flow of gas.

As the air vent is located on the top of the gas valve the gas valve air vent is often times susceptible to clogging from insects, dust and if used outdoors, also to snow, ice, and/or other foreign particles or fluids. Cloggage of the gas valve air vent can prevent the gas valve from operating properly.

To prevent gas from escaping in the even that the diaphragm of a gas valve ruptures, it is known in the art to mount a vent limiter to the air vent of the gas valve. The vent limiter allows air to slowly enter or leave the gas valve to allow for the movement of the diaphragm but blocks a rapid discharge of gas to the outside atmosphere if the diaphragm should rupture. An example of a vent limiter is the Vent Limiting Means (Product number 12A04/12A09) produced by Maxitrol® Company which is located in Southfield, Mich. 48037-2230. Although vent limiters such as the Maxitrol® Vent Limiting Means adequately prevents gas from escaping through the air vent in the event that the diaphragm ruptures, they are susceptible to clogging due to bugs, dust snow, ice, and/or other extraneous fluids.

It is also know in the art to protect the gas valves from clogging while preventing gas from escaping if the diaphragm ruptures. One such approach for protecting the clogging of gas valves is by attaching a weather cap over the entire gas valve. An example of the aforementioned device is shown in my U.S. Pat. No. 5,975,123, which discloses a one-piece weather cap that can be installed over a gas valve and frictionally held thereon to prevent bugs, dust snow, ice, and/or other extraneous fluids from obstructing the air vent in the valve. The one-piece weather cap of U.S. Pat. No. 5,975,123 can be used in conjunction with a vent limiter in a two-step process to not only protect the gas valve from outside elements but also to prevent the escape of gas in the event that the diaphragm ruptures. In the process one first attaches the vent limiter to the outlet of the gas valve vent and then installs the weather cap over the gas valve vent.

Other vent devices for protecting the clogging of gas valve vents includes devices that can be mounted to the air vent of the gas valve with the discharge end of the device pointing downward. One of advantages of using such devices is the device is a less costly way to reduce or prevent, rain, snow, bugs, and dust from blocking the gas valve vent while still allowing access to other regions of the gas valve. An example of the aforementioned device is a bent or U-shape tube having an end that can be inserted into the outlet of the gas valve vent with the second end of the tube facing downward so as to prevent rain and snow from entering the tube.

A further device that vents the gas valve to the outside atmosphere while preventing rain and snow from entering the gas valve or blocking the gas valve vent is sold by Maxitrol® Company, the Maxitrol vent protector (Product Number 13A15) has an end can be screwed into the outlet of the gas valve vent for protecting gas valve vent from rain, snow, dust or other foreign particles and insects.

However, a disadvantage of using devices such as the bent tubing or Maxitrol® Company's vent protector is that neither of the devices prevent gas from escaping from the gas valve through the air vent in the event that the gas valve diaphragm ruptures. In addition, using devices such as the bent tubing or Maxitrol® Company's vent protector also prevent the use of the vent limiter since the bent tubing and Maxitrol® Company's vent protector are mounted to the same gas valve vent as the vent limiter.

BRIEF SUMMARY OF THE INVENTION

The present invention comprises a weather cap that incorporates a vent limiter to simultaneously provide vent limiting capabilities as well as preventing atmospheric elements from entering or blocking the gas valve air vent.

The weather cap comprises a gas valve vent limiter, a gas vent attachment cap, and a gas valve vent attachment member. The gas valve vent attachment member comprises a first end and a second end. Located on an exterior surface of the attachment member proximate the first end is a male thread for rotationally engaging a female thread located on an interior surface of a gas valve vent outlet. The attachment member includes an integral handle located proximal the second end of the attachment member for allowing a user to grasp and rotate the attachment member. The handle includes a plurality of opened channels extending through the handle in a direction parallel to the attachment member, the channels of the handle allowing for the movement of gas therethrough. The attachment member also includes a passageway located within the interior of the attachment member with the passageway extending from the first end to the second end of the attachment member for the movement of gas therethrough.

Located on an interior surface of the attachment member proximate the second end of the attachment member is a female thread for rotational mating with a male thread located on an exterior surface of the gas vent limiter.

The gas vent attachment cap comprises a hollow cylindrical housing having an opened end and a closed end and is securable to the attachment member to protect the plurality of opened channels of the handle from being completely clogged.

BRIEF DESCRIPTION OF THE DRAWINGS

FIG. 3 shows a partial cross-sectional exploded view of a dual-purpose vent attachment assembly of the present invention;

FIG. 4 shows a bottom view of the dual-purpose vent attachment member of FIG. 3.

DESCRIPTION OF THE DRAWINGS

Figure 1:
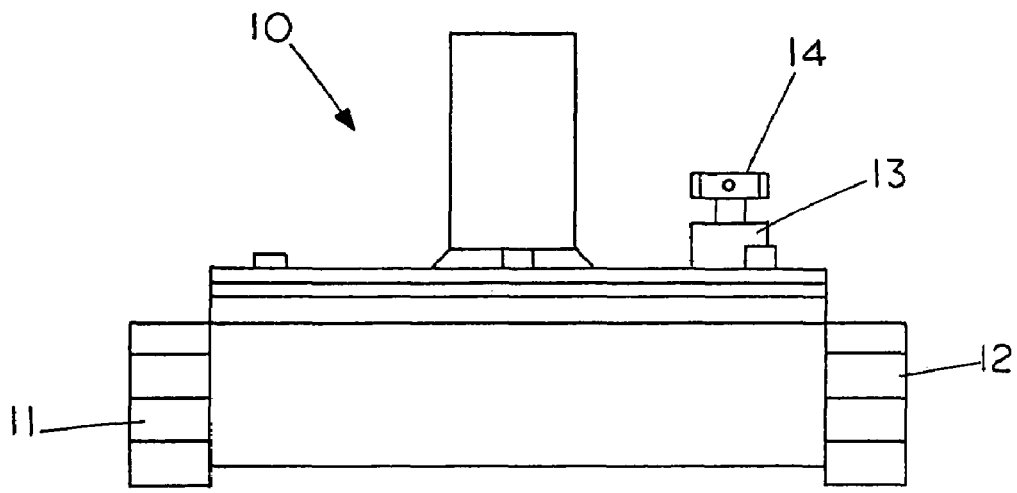
FIG. 1 shows a gas valve and a vent limiter of the prior art.

Referring to FIG. 1, reference numeral 10 identifies a typical gas valve 10 known in the art. Gas valve 10 includes an inlet 11, an outlet 12 and a gas vent outlet 13. Secured to gas vent outlet 13 is a vent limiter 14 for limiting the venting of gas therethrough.

Figure 2:
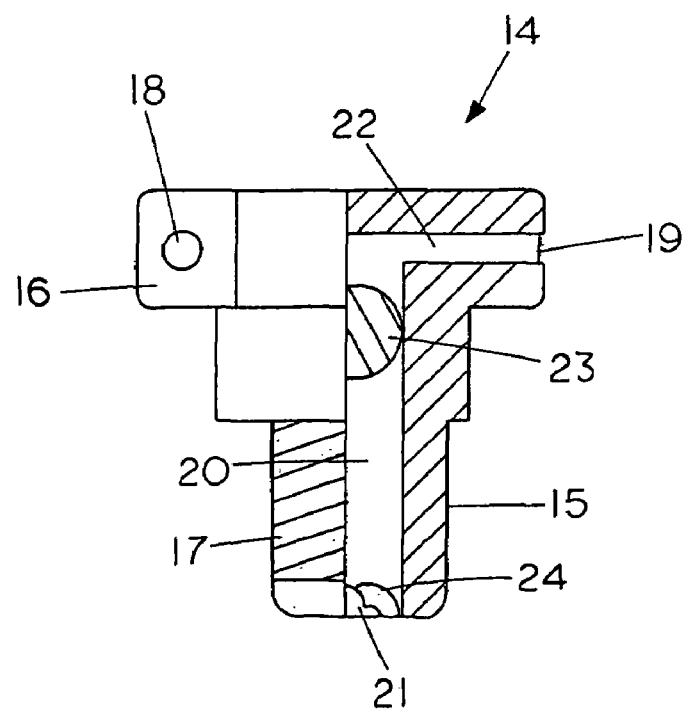
FIG. 2 shows a partial cross-sectional view of the vent limiter of FIG. 1.

Referring to FIG. 2, FIG. 2 shows a partial cross-sectional view of vent limiter 14. Vent limiter 14 is produced by Maxitrol® Company (Product number 12A04/12A09) which is located in Southfield, Mich. 48037-2230. As shown in FIG. 2, vent limiter 14 comprises a bolt-like configuration and includes a tail portion 15 and a head portion 16. Located on an exterior surface of the tail portion 15 is a male thread 17 for rotational engaging a corresponding female thread. Vent limiter 14 also includes a pair of venting holes 18 and 19 located parallel to each other on a lateral surface of the head portion 15, which runs in a direction parallel to tail portion 15.

Located within the vent limiter 14 is a passageway 20 extending from the head portion 16 to an orifice 21, passageway 20 allowing for the movement of gas through vent limiter 14. Vent limiter 14 also includes channels 22 located within the head portion 16 of vent limiter 14, the channels 22 connecting venting holes 18 and 19 to passageway 20.

In further regards to FIG. 2, also located within passageway 20 is a check ball 23 for limiting the flow of gas through passageway 20 into channels 22 and eventually out into the atmosphere by way of venting holes 18 and 19 in the event of a diaphragm rupture.

In order to maintain check ball 23 within passageway 20, vent limiter 14 also includes a stopper 24 secured to the orifice 21 of tail portion 15. A common feature of the stopper is that the stopper prevents check ball 23 from completely blocking off the flow of gas or air from an outside atmosphere through orifice 21. Sufficient clearance between the ball and the passageway allows for air to slowly flow through the passageway and around the ball; however, if a condition such as diaphragm rupture occurs the rapid increase in pressure drives the ball 23 against the top of the vent limiter to block the flow of gas out of the gas valve.

FIG. 3 is a partial cross-sectional exploded view showing a dual-purpose vent attachment assembly 25 of the present invention comprising three components. The three components include a gas vent attachment member 26, the vent limiter 14 and a gas vent attachment cap 33. Although gas vent attachment member 26 and the gas vent attachment cap 27 can be made from a variety of material such as a metal, gas vent attachment member 26 and the gas vent attachment cap 27 are preferably made from a polymer plastic or the like.

Gas vent attachment member 26 includes main body 27 having a first end 27a and a second end 27b. Located on an exterior surface proximate first end 27a of main body 27 is a male thread 39 for rotationally engaging a corresponding female thread. Located proximate second end 27b of main body 27 is a circular handle 28 for allowing a user to grasp and rotate main body 27. In FIG. 3, handle 28 is shown as being integral to the second end 27b of main body 27. Handle 28 includes a mateable slot 29 extending around a lateral circumferential surface 28a of handle 28, the lateral circumferential surface 28' located on handle 28 in a direction parallel to said main body 27. As shown in FIG. 3, handle 28 further includes a plurality of open channels 30 extending through handle 28 in a direction perpendicular to slot 29, channels 30 allowing for the movement of gas therethrough.

FIG. 4 is a bottom view of the attachment member 26 of FIG. 3 showing the arrangement of the plurality of channels 30 on handle 28. As shown in FIG. 4, the plurality of channels 30 are located on the underside of handle 28 between a circumferential periphery 28b of handle 28 and main body 27 to prevent water rain or snow from entering the channels when the unit is mounted on a gas valve. Although the position of channels 30 on handle 28 can vary in alternative embodiments such as for example evenly or randomly spread throughout handle 28, in the present embodiment channels 30 are positioned on handle 28 in a manner which forms the design of a pair of circular rings on handle 28.

Referring back to FIG. 3, located on the interior of main body 27 is a passageway 31 extending from the first end 27a to the second end 27b of main body 27 for the flow of gas therethrough. Located on an interior surface proximate the second end 27b of main body 27 is a female thread 32 for rotationally engaging the male thread 17 of vent limiter 14. The mating engagement of vent limiter 14 to attachment member 26 enables attachment member 26 to limit the rate of air or gas flowing out from the gas valve through the gas valve vent and ultimately to the outside atmosphere. That is, the mating engagement of vent limiter 14 to attachment member 26 allows for the normal flow of air in and out of the gas valve 10 from an outside atmosphere to thereby allow for movement of the diaphragm. However, in the event that the gas valve diaphragm ruptures, the vent limiter is able to cut-off the flow of gas from gas valve 10 through gas valve vent 13 and ultimately to the outside atmosphere.

Gas vent attachment cap or cover 33 comprises a hollow cylindrical housing 34 having an opened end 34a, a closed end 34b, and a sidewall 35 for frictionally engaging the lateral circumference surface 28a of handle 28. Located on sidewall 35 is a protrusion such as an annular ring 35a that forms locking engagement with matetable slot 29. Although not shown, alternative embodiments of gas vent attachment cap 33 can use frictional engagement or threaded members to secure the cap 33 to the member 26.

The securement of gas vent attachment cap 33 to attachment member 26 inhibits and protects channels 30 of attachment member 26 from being completely clogged due to insects, dust, and if used outdoors, also to rain, snow, ice, and/or other foreign particles or fluids which can prevent the gas valve from operating properly by hindering the movement of the diaphragm.

Figure 5:
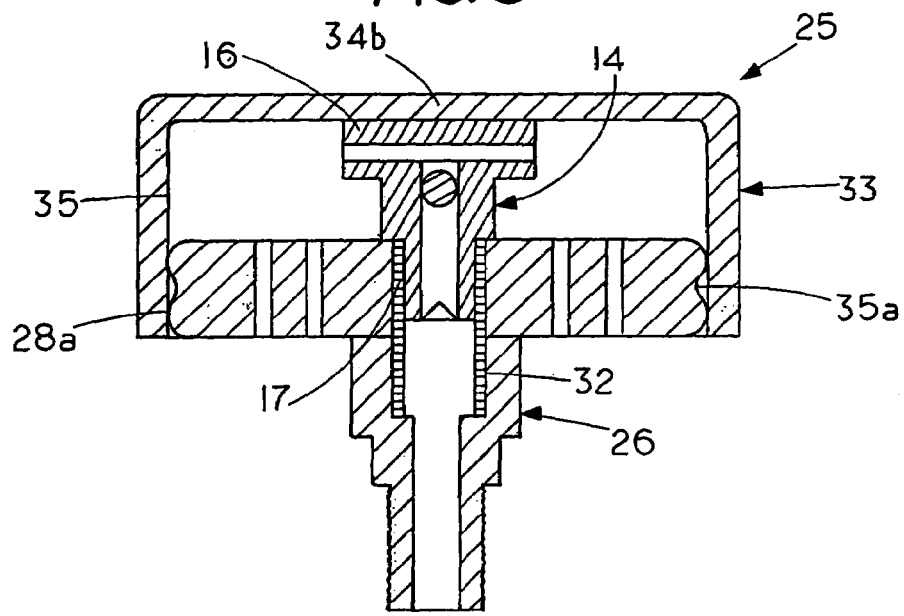
FIG. 5 shows a cross-sectional view of the assembly of the three components of dual-purpose vent attachment assembly of FIG. 3.

FIG. 5 shows a cross-sectional view of the assembly of the three components of dual-purpose vent attachment assembly 25 of the present invention, namely gas vent attachment member 26, vent limiter 14 and gas vent attachment cap 33. When assembled, vent limiter 14 is secured to attachment member 26 through the rotational mating between the male thread 17 of vent limiter 14 and the female thread 32 of attachment member 26. Gas vent attachment cap 33 is secured to attachment member 26 through a frictional engagement between the lateral circumferential surface 28a of handle 28 and the sidewall 35 of gas vent attachment cap 33.

In the assembled form, the dual-purpose vent attachment assembly 25 of the present invention provides a one-step process for limiting the venting of gas from the gas valve through the gas valve vent outlet while preventing atmospheric elements from entering or blocking either the vent limiter 14 or the gas valve.

Figure 6:
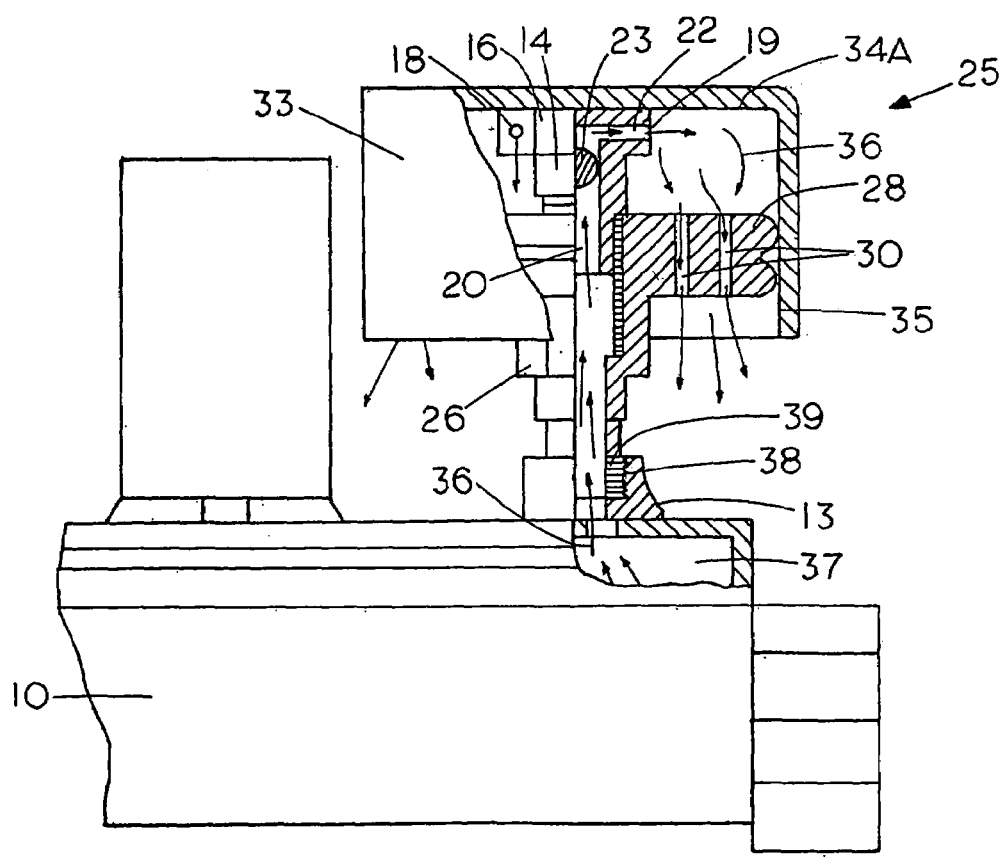
FIG. 6 shows a close-up partial cross-sectional view of the interaction between the dual-purpose vent attachment assembly and gas valve.

FIG. 6 is a close-up partial cross-sectional view showing the operation of the attachment assembly 25 when secured to gas valve 10. In use, attachment assembly 25 is secured to gas valve 10 through the rotational mating between the male thread 39 of attachment member 26 and a female thread 38 located on an interior surface of the venting outlet 13 of gas valve 10.

In the operation of the dual-purpose vent attachment assembly 25 of the present invention as shown in FIG. 6, a normal flow of air is allowed to move in and out of the gas valve 10 from an outside atmosphere allowing for the movement of the diaphragm to regulate gas flow. However, in the event that the gas valve diaphragm ruptures, a rapid gas flow (shown as arrow 36) within interior chamber 37 will move through the ruptured diaphragm, through vent outlet 13 and into the passageway 31 of attachment member 26. Once in passageway 31, gas flow 36 will move through passageway 31 and into vent limiter 14. After the gas enters vent limiter 14, the gas will move through the passageway 20 of vent limiter 14 until the gas reaches check ball 23. Note that although check ball 23 is shown located proximal to head portion 16, the actual position of check ball 23 will vary within passageway 20 of vent limiter 14, depending on various factors including the amount of pressure exerted by the gas flow 36.

At a high flow rate the check ball 23 is forced to the top of the passageway where it seats and prevents gas from escaping through passageway 20 of vent limiter 14. The gas currently in the passageway 20 is prevented from moving further through the passageway 20 dues to check ball 23 seating on the vent limiter.

The rate of gas flowing into passage 20 will determine whether or not check ball 23 is seated at the junction between passageway 20 and channels 22. For example, the normally slow flow of air through passage 20 that allows for the movement of the diaphragm for gas regulation will not seat check ball 23 whereas a flow of gas through passage 20 from a ruptured diaphragm is sufficient to seat check ball 23 at the junction between passageway 20 and channels 22 so as to prevent the gas from escaping through vent limiter 14.

As shown in FIG. 6, the air or gas that passes around check ball 23 will continue to move through passageway 20 until it arrives at the junction point between passageway 20 and channels 22 of vent limiter 14. At the junction point, the air is then directed through channels 22 and out of vent limiter 14 by way of venting holes 18 and 19 of vent limiter 14. Air that escapes through venting holes 19 of vent limiter 14 is then directed through channels 30, which have discharge ends on the underside of handle 28, and into the environment by the sidewall 35 and closed end 34b of cap 33.

Thus the present invention blocks the venting rate of gas in the gas valve chamber 37 in situations in which the diaphragm located within chamber 37 has ruptured in order to prevent dangerous gas therein from leaking to the outside atmosphere, note again that the present invention, through the use of sufficient diametrical clearance between the ball and the passageway will not completely block the movement of air into the gas valve from the outside atmosphere during normal operation of the gas valve.

The present invention also includes a method for limiting the venting rate of gas from an interior of the gas valve 10 through the vent outlet 13 to an outside atmosphere comprising the steps of: (1) securing the gas vent limiter 14 to the gas vent attachment member 26 by rotationally mating the male thread 17 of the gas vent limiter 14 with the female thread 31 of the attachment member 26; (2) securing the gas vent attachment cap 33 to the attachment member 26 through a frictional engagement between the sidewall 35 of the attachment cap 33 and the lateral surface 28a of the attachment member 26; and (3) securing the attachment member 26 to the gas valve outlet 13 by rotationally mating the male threads 29 of attachment member 26 with the female thread 38 of gas valve outlet 13.

The above method may also include the step of further securing the gas vent attachment cap 33 to the attachment member 26 by matingly engaging the slot 29 of the attachment member 26 with a ring integrally located on an interior surface of vent attachment cap 33.

I claim:

1. A weather cap for gas valve comprising:
    a gas valve vent attachment member for securing to a gas valve vent outlet;
    a cover directly connected to said gas valve vent attachment member, said cover and said gas valve attachment member forming a housing having a chamber therein;
    a vent limiter located in said chamber and secured to the gas valve vent attachment member;
    a first gas passage in said housing to permit ingress and egress of gas into said chamber from a gas valve; and
    a second gas passage in said housing, said second gas passage open to the atmosphere to permit venting of gas to the atmosphere with said second gas passage located on an underside of said chamber to thereby shielding said vent limiter from blockage by preventing rain or snow from entering said chamber.

2. The weather cap of claim 1 wherein said attachment member includes a male thread located on an exterior surface of said attachment member for rotationally securing said attachment member to said gas valve vent outlet.

3. The weather cap of claim 1 wherein said attachment member includes a female thread located on an interior surface of said attachment member for rotationally engaging a male thread located on an exterior surface of said vent limiter.

4. The weather cap of claim 1 wherein said cover is secured to said attachment member by a frictional engagement between a sidewall of said cover and a lateral surface of said attachment member.

5. The weather cap of claim 1 wherein said attachment member and said cover are made of a polymer plastic.

6. The weather cap of claim 1 wherein said second gas passage comprises a plurality of channels located on an underside of said chamber for venting of gas to the atmosphere.

7. A weather cap for gas valve comprising:
- a gas valve vent attachment member for securing to a gas valve vent outlet, said attachment member having a first end and a second end;
- a cover directly connected to the second end of said gas valve attachment member, said cover and said gas valve attachment member forming a housing having a chamber therein;
- a vent limiter located in said chamber and secured to the second end of the gas valve vent attachment member;
- a first gas passage in said housing to permit ingress and egress of gas into said chamber from a gas valve; and
- a second gas passage in said housing, said second gas passage comprising a plurality of channels opened to the atmosphere to permit venting of gas to the atmosphere with said plurality of channels located on an underside of said chamber to thereby shielding said vent limiter from blockage by preventing rain or snow from entering said chamber.

8. The weather cap of claim 7 including a male thread located on an exterior surface of said attachment member proximate the first end for rotationally securing said attachment member to said gas valve vent outlet.

9. The weather cap of claim 7 including an integral handle located proximal the second end of said attachment member for allowing a user to grasp and rotate said attachment member.

10. The weather cap of claim 7 wherein said vent limiter is secured to said attachment member through a rotational mating between a male thread located on an exterior surface of said vent limiter and a female thread located on an interior surface of said attachment member.

11. The weather cap of claim 7 wherein said gas valve attachment member and said cover are made of a polymer plastic.

12. The weather cap of claim 7 wherein said cover is connected to said gas valve attachment member by a protrusion on a sidewall of said cover and a lateral surface of said attachment member.

13. The weather cap of claim 7 wherein said second gas passage comprises a plurality of channels located on an underside of said chamber in a ring pattern for venting of gas to the atmosphere.

14. The weather cap of claim 7 wherein said second gas passage comprises a plurality of channels evenly spread throughout an underside of said chamber for venting of gas to the atmosphere.

15. The weather cap of claim 9 wherein said cover is secured to said attachment member by a frictional engagement between a sidewall of said cover and a lateral surface of said integral handle.

16. The weather cap of claim 9 wherein the handle of said attachment member includes a mateable slot located on a lateral surface of said handle in a direction perpendicular to said attachment member, said slot extending around the periphery of the lateral surface of said handle.

17. The dual-purpose vent attachment assembly of claim 16 wherein said cover includes an integral ring extending along an interior circumference of a sidewall of said cover for matingly engaging the slot of said attachment handle for securing the cap to said attachment member.

18. A method for limiting the venting rate of gas from an interior of a gas valve through a vent outlet to an outside atmosphere comprising the steps of:
- securing a vent limiter to a gas vent attachment member by rotationally mating a male thread of said vent limiter to a female thread of said attachment member;
- attaching a cover to said attachment member through a frictional engagement between a sidewall of said cover and a lateral surface of said attachment member; and
- securing said attachment member to a gas valve vent outlet by rotationally engaging a male thread of said attachment member to said gas valve outlet.

19. The method of claim 18 including the step of further securing the cover to said attachment member by matingly engaging a slot located on the lateral surface of said attachment member with a ring integrally located on an interior surface of the sidewall of said cover.

* * * * *